Aug. 31, 1965

K. P. HILLEGASS ETAL 3,203,510

WRAP PARKING AND EMERGENCY BRAKE

Filed Aug. 26, 1963

INVENTOR.
CARL E. BRICKER
BY KENNETH P. HILLEGASS

J.B. Holden
ATTORNEY

Aug. 31, 1965

K. P. HILLEGASS ETAL 3,203,510

WRAP PARKING AND EMERGENCY BRAKE

Filed Aug. 26, 1963

INVENTOR.
CARL E. BRICKER
BY KENNETH P. HILLEGASS

*J.B. Holden*
ATTORNEY

United States Patent Office 3,203,510
Patented Aug. 31, 1965

3,203,510
WRAP PARKING AND EMERGENCY BRAKE
Kenneth P. Hillegass, Copley, and Carl E. Bricker, Cuyahoga Falls, Ohio, assignors to The Goodyear Tire & Rubber Company, Akron, Ohio, a corporation of Ohio
Filed Aug. 26, 1963, Ser. No. 304,490
5 Claims. (Cl. 188—77)

This invention relates to a wrap type parking and emergency brake, and more particularly to a brake wherein the brake band is wrapped a plurality of times around the brake drum with associative mechanism to tighten the band on the drum to effect the braking action.

Heretofore it has been known that there are many and varied types of parking and emergency brakes. However, these brakes have proven generally unsatisfactory because they are usually associated with the conventional brakes of the vehicle, and do not apply sufficient braking action to stall a vehicle attempting to start with the brake in the on or engaged position. Frequently, there have been occasions when automobiles have been started and run for considerable distances with the emergency brakes engaged in the on position, which running has damaged, or burned out the emergency brake system. Further, the situation exists particularly in heavier vehicles, wherein a parking or emergency brake does not provide adequate braking action for an emergency stop. Also, most of the emergency brake systems in use today require considerable force to even make them function to a minimum braking standard.

It is the general object of the invention to avoid and overcome the foregoing difficulties and objections to prior art practices by the provisions of a parking and emergency brake which utilizes a brake band wrapped a plurality of adjacent helical turns around a brake drum, and wherein lever means connect the ends of the band, and wherein a extremely small pressure to the lever means wraps the band tightly around the brake drum to exert a considerable pressure on the brake drum.

A further object of the invention is to provide a wrap type emergency brake wherein the brake band is wrapped around a rotatable brake drum, and held in non-engaging position by an internal spring unwinding action of the brake band itself.

Another object of the invention is to provide an emergency type of brake which utilizes a brake band wrapped a plurality of times around a brake drum wherein the band is free to rotate slightly in relation to the drum so that when the drum rotates with the band in the engaging position, the band tends to wind itself tighter around the drum due to the winding action of the drum rotation.

A further object of the invention is to provide an emergency brake which operates in both forward and reverse directions and wherein extremely high braking forces are exerted for a very small applied force so that excellent braking action is achieved for extremely heavy vehicles, and wherein the brake mechanism is uncomplicated, easily fabricated, durable, and relatively inexpensive.

Another object of the invention is to provide an emergency and parking brake which is separate from the normal braking system of a vehicle so that no damage will occur to the normal braking system, if the emergency brake fails, or vice versa.

The aforesaid objects of the invention and other objects which will become apparent as the description proceeds are achieved by providing in an emergency or parking brake the combination of a rotatably mounted brake drum, a brake band making a plurality of helical wraps around the drum, the wraps of the band being closely adjacent to each other, and the band being wrapped with internal spring action to urge the band to unwrap from the drum, a friction material affixed on the side of the band adjacent to the brake drum, separate link means engaging each end of the brake band, fixed frame means mounting the link means, the link means permitting limited rotational shifting movement of the brake band in the direction to effect tighter wrapping on the drum, single lever means engaging each separate link means so that movement of the single lever in one direction causes movement of both ends of the brake band in a direction to effect tightening of the band around the drum, and movement of the single lever in the opposite direction causes movement of both ends of the brake band in a direction to effect loosening of the brake band around the drum, and the single lever means having a long actuating arm and short actuation arms to effect high torque forces on the separate link means for a small torque force on the single lever means.

For a better understanding of the invention reference should be had to the accompanying drawings, wherein.

Figure 1:
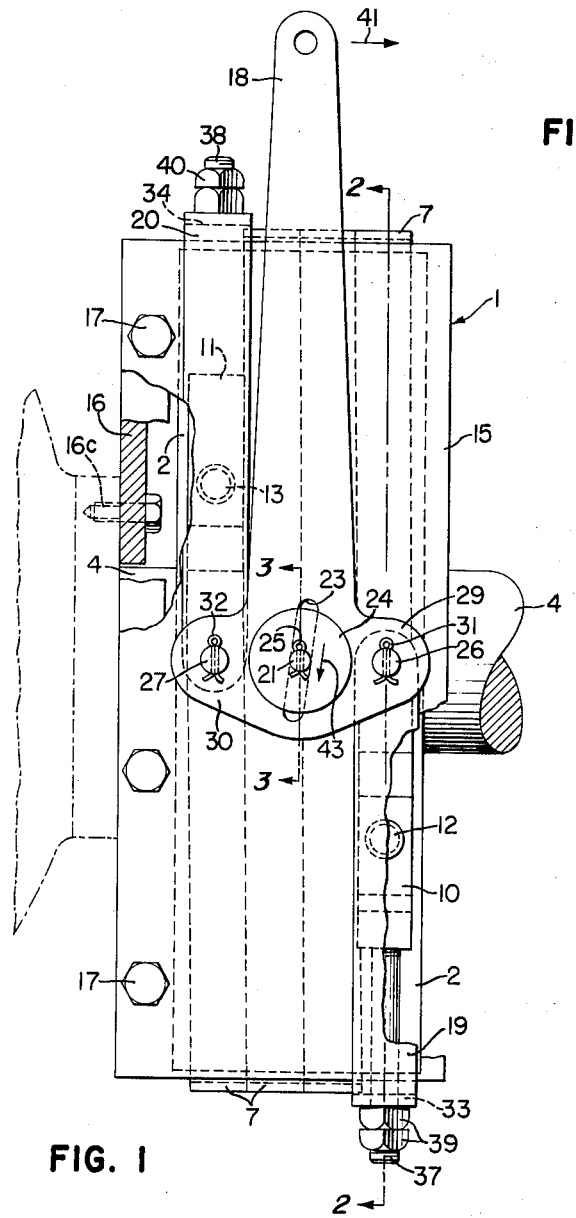
FIGURE 1 is a plan view of one embodiment of the principles of the invention showing the relationship between the single actuating lever and the separate links connecting to the ends of the brake band.

Although the principles of the invention are broadly applicable to an emergency brake for any type of rotational apparatus, the invention is particularly designed as an emergency or parking brake for automobiles and other motor driven vehicles, and hence it has been so illustrated and will be so described.

With specific reference to the form of the invention illustrated in the drawings, the numeral 1 indicates generally a wrap type parking and emergency brake which comprises a brake drum 2 having a drop center flange 3 which is fixedly mounted on a rotatable shaft 4 as by being secured to a flange 5 on the shaft by bolt means 6. In the apparatus described, the shaft 4 is generally the vehicle drive shaft so that the drum 2 may be fixedly mounted thereon. However, the invention contemplates that the drum 2 may vary in size and may be mounted in any manner desired in order to stop a shaft, or to stop a wheel or some other member to which the drum is secured.

Figure 4:
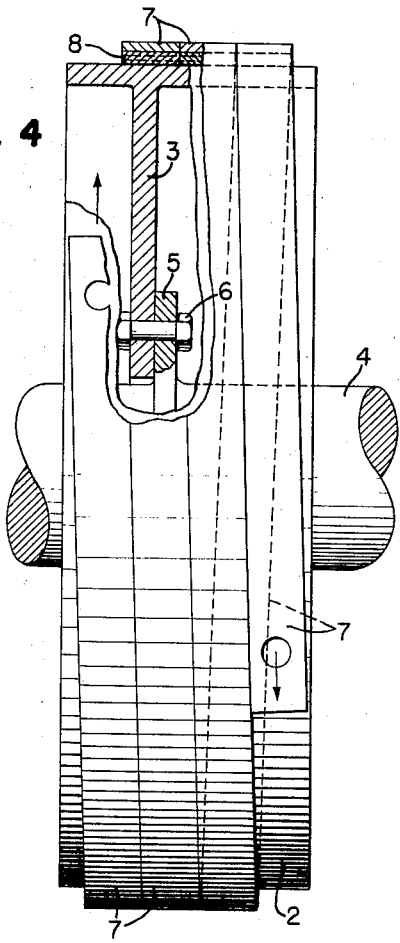
FIGURE 4 is a view similar to FIGURE 1, with a portion broken away.

A brake band 7, which is made from a spring metal strap, is positioned under some external force in a plurality of wraps in axially closely spaced, helical relation around the outer peripheral surface of the drum 2, as best seen in FIGURE 4. In order to provide proper braking, a conventional frictional material 8 is affixed to the brake band 7, as by rivets 9, so that the material 8 is on the radially inner side of the band 7 adjacent to the drum 2.

Figure 3:
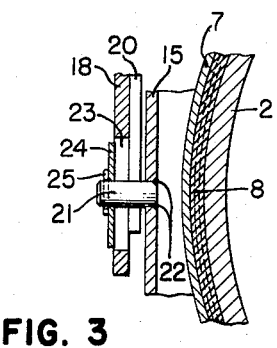
FIGURE 3 is a fragmentary vertical cross sectional view of the sliding pivotal feature of the actuating arm taken on line 3—3 of FIGURE 1.
Figure 2:
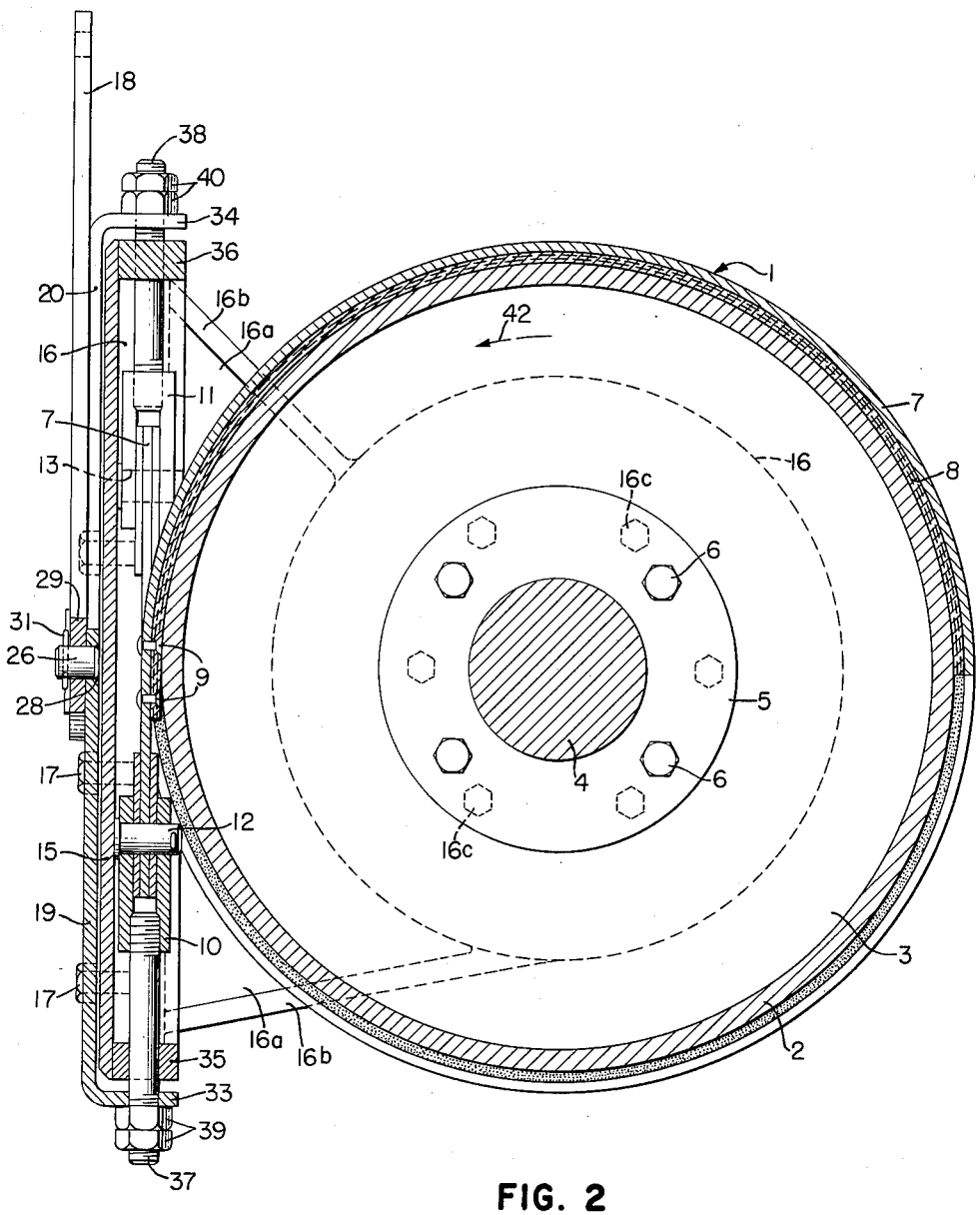
FIGURE 2 is a vertical cross sectional view of the brake unit taken on line 2—2 of FIGURE 1.

The ends of the bands 7 extend substantially tangentially from the drum 2 and are affixed to suitable holding means, such as clips 10 and 11 and held in place in the clips, as by pins 12 and 13, respectively. In order to support the clips 10 and 11 holding the ends of the brake band 7, a frame 15, mounted to a supporting member indicated generally by numeral 16, is provided. The member 16 includes a solid center web 16a having edge flanges 16b, and is mounted to a stationary housing as by bolts 16c. Frame 15 is mounted to member 16, as by bolt means 17. The frame 15 mounts a long actuating lever 18 and two connecting links 19 and 20, respectively. With reference to FIGURE 3, it can be seen that a pivot pin 21 is mounted, as by welding at 22 on the frame 15. The actuating lever 18 contains a slot 23 which extends essentially parallel to the convolutions of the wrapped brake band 7. The slot 23 receives over the pin 21, and the lever 18 is conventionally held in position as by a large washer 24 and cotter key 25, as shown. Similarly, the links 19 and 20 have mounted thereon posts 26 and 27, respectively, which are welded thereto, as at 28, as indicated in FIGURE 2. The pins 26 and 27 extend through holes in ears 29 and 30 extending from the lever 18, and are held in position, as by cotter keys 31 and 32 respectively.

The ends of links 19 and 20 are bent normal to the flat elongated portions thereof into tabs 33 and 34, respectively, which are positioned adjacent to the ends of the frame 15, as indicated in FIGURE 2. The frame 15 has brackets, or flanges 35 and 36, which are adjacent and parallel to the tabs 33 and 34, respectively, secured thereto. The tabs 33 and 34, and flanges 35 and 36 contain holes which allow slidable engagement with bolts 37 and 38 respectively. Bolts 37 and 38 extend through the holes, as indicated in FIGURES 1 and 2, and are removably screwed into the clips 10 and 11, all as specifically shown in FIGURE 2. Lock nuts 39 and 40 are provided on the ends of the bolts 37 and 38 to limit the inward movement of the clips 10 and 11 and provide shoulder surfaces for the engagement of tabs 33 and 34 of links 19 and 20, respectively. It is to be noted that bolts 37 and 38 are in sliding engagement with the tabs 33 and 34 and flanges 35 and 36. Thus, the brake band 7 is free for radial and/or rotational movement to tighten the band 7 in relation to the drum 2, but is limited or held from unwrapping from the drum 2, except for movement to the disengaged position.

With reference to FIGURE 1, it can be seen that if actuating lever 18 is pivotally rotated to the right as indicated by arrow 41, the levers 19 and 20 will butt against the lock nuts 39 and 40 causing the band 7 to be tightened with respect to the drum 2. Supposing that the drum 2 is rotating in the counterclockwise direction, as indicated by arrow 42 in FIGURE 2, the friction material 8 contacting the rotating drum 2 tends to wrap itself in the direction of rotation around the drum 2. Thus, since the opposite end of the band is held stationary by lock nuts 40 butting on the tab 34 of the link 20, the brake band 7 will tend to wrap itself tightly around the drum 2 and to move the clip 10 and bolt 37 away from the drum. This will urge the actuating lever 18 to move in a radial direction in slot 23, as indicated by arrow 43 in FIGURE 1. As the tab 34 of the link 20 abuts against the flange 36 of the frame 15 to insure a positive and stationary stop to that end of the brake band 7, a new pivot, the pin 27, is provided for the actuating lever 18 to enable the link 19 to move out tangentially of the drum to take up the increased length of the band 7 at that end as the band 7 wraps itself tightly around the drum 2. Therefore, in actual operation, once lever 18 is actuated, the response is practically automatic as the band 7 simply wraps itself around the drum 2 with only a small force having to be applied to the lever 18. In fact, in the braking sequence just described, the tab 33 of the link 19 will be applying a very light outward pressure against lock nuts 39 during the braking action, as the wrapping frictional resistance between friction material 8 and the rotating drum 2 causes the high braking action with small applied force, which is the object of the invention. When the actuating lever 18 is released, the internal spring tension under which the band 7 is wrapped, as described previously, will be sufficient to release the band 7 from the drum 2.

Conversely, if drum 2 is rotating in the opposite direction, the exact opposite sequence to that described above will happen with actuating lever 18 radially shifting in the opposite direction to effect the braking action. Thus, an extremely effective emergency and parking brake action is achieved regardless of the direction of rotation of the brake drum, i.e., forward or reverse directions, as the brake band 7 will wrap itself tightly around the drum 2 in the manner previously described. Thus, a double acting parking brake is effected.

In actual tests conducted with the brake described heretofore on a drum diameter of 14 inches, and actuating lever length of 10½ inches, a 10 pound pull on the actuating arm 18 produced a holding torque of 32,200 pound inches. Obviously, with this kind of torque applied to the drive shaft or drive axle of a vehicle, it would be impossible to rotate the shaft with the conventional driving motor for the vehicle. Thus, starting a vehicle with the emergency brake or parking brake in the on and actuated position becomes impossible, which thereby eliminates any possibility of burning out, or severely damaging a brake system. Further, a truly effective emergency brake is achieved which is reliable to give a high performance braking action under emergency conditions.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. In a brake, the combination of
   a rotatable brake drum,
   a non-rotatable brake band positioned under internal spring tension in closely spaced helical convolutions around the outer peripheral surface of said brake drum,
   non-rotatable frame means slidably supporting the ends of said brake band, said band being free for sliding movement with respect to said frame means in a direction to tighten said band on said drum, limiting means secured to each end of said brake band to limit the sliding movement thereof with respect to said frame means in a direction to unwind off said drum,
   actuating lever means having small opposed actuation arms on one end thereof mounted at a point centrally positioned between said actuating arms for unrestricted pivotal movement on said frame means, said actuation lever means being further mounted to said frame means so as to have limited linear movement in a direction substantially tangent to portions of the convolutions of said brake band,
   a pair of link means slidably receiving each end of said brake band and connected pivotally to one of said actuation arms so that pivotal movement of said actuating lever means in one direction causes said link means to engage said limiting means to wrap said brake band tightly around said brake drum causing said actuating lever means to move linearly in the direction of rotation of said brake drum to cause one of said link means to be limited in its movement by said frame means to shift the effective pivot point of said actuating lever means to the pivot point of said link means at its respective actuation arm operatively connecting the limited end of said brake band.

2. In a brake, the combination of
   a rotatable brake drum,
   a non-rotatable brake band positioned under internal spring tension in closely spaced helical convolutions around the outer peripheral surface of said brake drum,
   non-rotatable frame means slidably supporting the ends of said brake band, said band being free of sliding movement with respect to said frame means in a direction to tighten said band on said drum, stop means secured to the brake band limiting sliding movement of the brake band with respect to said frame means in a direction to unwind off said drum,
   actuating lever means having small opposed actuation arms on one end thereof movably mounted in said slot of said frame means for unrestricted pivotal movement and limited linear movement with respect to said frame means,
   link means slidably receiving each end of said brake band between the stop means and the frame means and connected pivotally to one of said actuation arms so that pivotal movement of said actuating lever means in one direction causes said link means to engage said stop means to wrap said brake band tightly around said brake drum causing said actuating lever means to move linearly in the direction of rotation of said brake drum to cause one of said link means to be limited in its movement by said frame means to shift the effective pivot point of said actuating lever means to the pivot point of said link means at its respective actuation arm operatively connecting to the limited end of said brake band, said shift in the pivot point of said actuating lever means which thereby causes greater movement to the slidable end of said brake band to effect a high braking torque for a small actuation force, said actuating lever means returning to its initial position when released because of the internal spring tension in said brake band.

3. In a brake, the combination of
a rotatable brake drum,
a non-rotatable brake band positioned under internal spring tension in closely spaced helical convolutions around the outer peripheral surface of said brake drum,
non-rotatable frame means slidably supporting the ends of said brake band,
means limiting unwinding sliding motion of said brake band with respect to said frame means,
actuating lever means operatively mounted for unrestricted pivotal movement on said frame means and further mounted to have limited linear movement with respect to said frame means in a direction parallel to and tangent the convolutions of said brake band, said lever means comprising a long actuating arm and two opposing actuation arms on one end thereof with the mounting of said actuating lever means on said frame means being between said opposed actuation arms,
separate link means slidably received between each end of said brake band and the limiting means pivotally connected to an actuation arm, said link means limited in slidable relation with the brake band in one direction by the limiting means and in the other direction by the frame means.

4. In a brake, the combination of
a rotatable brake drum,
a non-rotatable brake band positioned under internal spring tension in closely spaced helical convolutions around the outer peripheral surface of said brake drum,
non-rotatable frame means slidably supporting the ends of said brake band,
means limiting unwinding sliding motion of said brake band with respect to said frame means,
actuating lever means, said lever means comprising a long actuating arm and two opposing actuation arms on one end thereof with an elongated slot extending between said opposed actuation arms and substantially in alignment with said long actuating arm,
pivot means pivotally mounting said actuating lever means to said frame means through said elongated slot,
separate link means slidably receiving each end of the brake band between said limiting means and said frame means each connecting to an actuation arm so that the elongated slot of said lever means is aligned substantially parallel to the convolutions of the brake band thereby causing said lever means to move linearly a short distance relative to said pivot means in the direction of drum rotation when said lever means are actuated to thereby increase the braking action of said brake band.

5. In a brake the combination of
a rotatable brake drum,
a non-rotatable brake band positioned in a plurality of closely spaced helical convolutions around the outer peripheral surface of the brake drum, said band having internal spring action tending to unwind itself,
limiting means operatively connected to the ends of the brake band,
frame means slidably supporting the limiting means to thereby hold the brake band in position off the drum in the non-actuated position and to prevent the brake band from unwinding off the drum, but allowing the brake band freedom of rotational wrapping movement in either direction to tighten around the drum, and
lever means pivotally mounted to the frame means and connected to the limiting means to effect movement of the connecting means in the direction to tighten the brake band around the drum, said lever means being slidable with respect to the frame means in a direction parallel to the convolutions of the brake band.

References Cited by the Examiner
UNITED STATES PATENTS
1,888,643  11/32  Truzicky _____ 188—77
2,955,680  10/60  Caero _____ 188—77 X FOREIGN PATENTS
22,685  1900  Great Britain.

ARTHUR L. LA POINT, *Primary Examiner.*
RALPH D. BLAKESLEE, *Examiner.*